(12) United States Patent
Islam et al.

(10) Patent No.: US 7,526,551 B1
(45) Date of Patent: Apr. 28, 2009

(54) SYSTEM AND METHOD FOR HIGHLY AVAILABLE TIMER SERVICE IN A J2EE CLUSTER

(75) Inventors: Akm N. Islam, Santa Clara, CA (US); Sreeram Duvur, Fremont, CA (US); Satish C. Viswanatham, San Francisco, CA (US); Kenneth D. Saks, Mountain View, CA (US); Kenneth Ebbs, Los Altos, CA (US); Mark A. Basler, Milpitas, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1219 days.

(21) Appl. No.: 10/676,635

(22) Filed: Oct. 1, 2003

(51) Int. Cl.
*G06F 15/173* (2006.01)

(52) U.S. Cl. .................. 709/226; 709/225; 709/219; 709/229; 370/252; 370/386; 370/242; 370/216

(58) Field of Classification Search .............. 709/226, 709/225, 219, 229; 370/252, 386, 242, 216
See application file for complete search history.

(56) References Cited

U.S. PATENT DOCUMENTS

| | | | | |
|---|---|---|---|---|
| 6,115,826 | A * | 9/2000 | Kinkade | 713/502 |
| 6,606,304 | B1 * | 8/2003 | Grinter et al. | 370/252 |
| 6,816,905 | B1 * | 11/2004 | Sheets et al. | 709/226 |
| 6,928,477 | B1 * | 8/2005 | Leymann et al. | 709/226 |
| 7,111,063 | B1 * | 9/2006 | Clark et al. | 709/225 |
| 7,127,712 | B1 * | 10/2006 | Noble et al. | 717/173 |
| 2003/0233648 | A1 * | 12/2003 | Earl et al. | 717/176 |
| 2003/0236867 | A1 * | 12/2003 | Natsuno et al. | 709/220 |
| 2006/0245388 | A1 * | 11/2006 | Jeon | 370/316 |

OTHER PUBLICATIONS

Linda G. DeMichiel, "Chapter 22 of EJB Specification 2.1," Sun Microsystems, Nov. 12, 2003(pp. 493-500).
Rahul Tyagi, "A Brief Review of the EJB 2.1 Specification,"http://builder.com.com/5100-6386_14-1049431-1-1.html, Sep. 16, 2002, (3 pages).
"BEA WebLogic Server™ and BEA WebLogic Express™: Programming WebLogic JTA," Jun. 24, 2002, (94 pages).
"WebSphere Commerce V5.5 Handbook Customization and Deployment Guide." IBM, Nov. 2003, (pp. 109-132).

* cited by examiner

*Primary Examiner*—Thanh Tammy Nguyen
(74) *Attorney, Agent, or Firm*—Robert C. Kowert; Meyertons, Hood, Kivlin, Kowert & Goetzel, P.C.

(57) ABSTRACT

A system and method for a highly available timer service may include a timer database operable to store information on one or more timers. The system may further include a plurality of servers in a cluster, each server containing a failure detection service, a timer service and one or more applications. In one embodiment, each application may be operable to request and process one or more timer notifications from the timer service contained in the same server. Each failure detection service may also be operable to detect a failure of other servers in the cluster. In addition, each timer service may be operable to retrieve information on the one or more timers from the timer database, and to provide a timer notification to any application in the cluster in response to a notification from the failure notification service that a server has failed.

18 Claims, 6 Drawing Sheets

| Timer ID 200 | Timer owner 202 | Timer database 150 Timer interval 204 | Timer expire 206 | Last active 208 | Periodic 210 |
|---|---|---|---|---|---|
| 1 | 130A | 50000 | 13:00:50.000 | 13:00:00.000 | No |
| 2 | 130C | 20000 | 13:00:20.000 | 13:00:00.500 | Yes |
| 3 | 130C | 1000 | 13:02:35.000 | 13:02:34.100 | Yes |

SYSTEM AND METHOD FOR HIGHLY AVAILABLE TIMER SERVICE IN A J2EE CLUSTER

BACKGROUND OF THE INVENTION

1. Field of the Invention

This invention relates to the field of high-availability computer systems and, more particularly, to providing redundant timer services.

2. Description of the Related Art

Many computer applications utilize a clock service or other timer service for a variety of reasons. For example, an application may need to produce output on a periodic basis. Accordingly, a timer service may send a notification of a timer event to the application on a periodic interval, in response to which the application may produce the required output. Alternatively, a timer event may be used to ensure that an application does not stall indefinitely when waiting for an external response.

Computer applications may also be vital to business and industry, so that failure of these applications may prove expensive. Highly reliable systems operable to provide constant availability for applications, such as a distributed system comprising multiple components, may assume a greater importance. For example, a web site may handle financial, production, sales, marketing or media applications. Failure to provide these applications to clients for even a few minutes could mean thousands or millions of dollars in lost income.

In conventional systems a central timer service may provide timer services to a cluster of application servers. However, should the timer service fail, timer events may go undelivered, thereby compromising application functionality.

SUMMARY

A system and method for a highly available timer service is disclosed. The system may include a plurality of servers in a cluster, with each server containing a timer service and an instance of one or more applications. The system may further include a failure detection service operable to detect a failure in the plurality of servers in the cluster. Each timer service may be operable to service timer requests from one or more application instances and, in response to the failure detection service detecting a failure, assume one or more timer operations from another failed timer service. Each timer service may further be operable to wait for a specified time period prior to assuming the one or more timer operations from a failed timer service in the cluster, and only assume the one or more timer operations if the failed timer service does not recover within the specified time period. The system may further be operable to provide any missed timer notifications to the one or more application instances.

Figure 1:
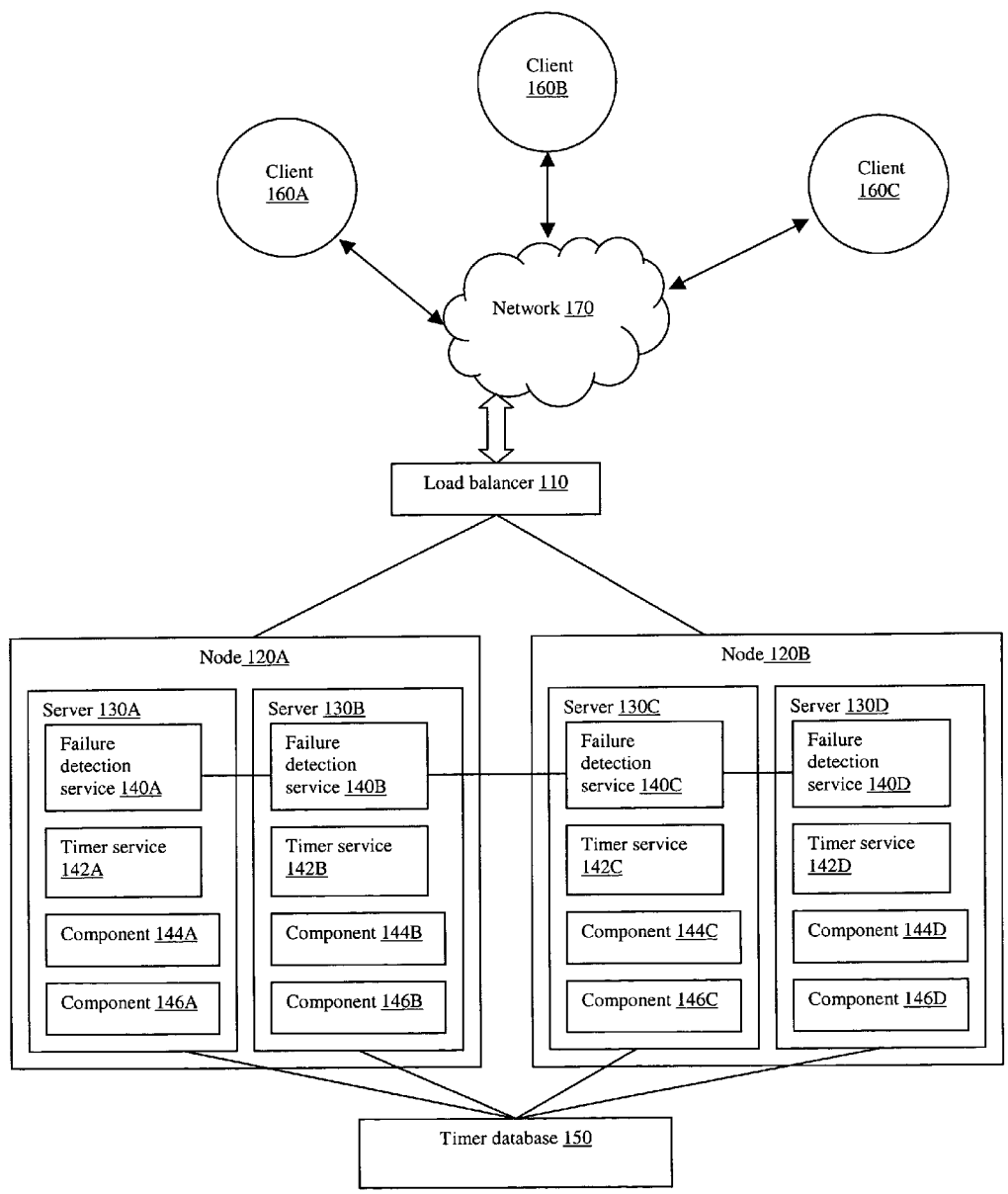
FIG. 1 is a block diagram of a distributed system, according to one embodiment.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Turning now to FIG. 1, a block diagram of an exemplary distributed system 100 is shown according to one embodiment. Distributed system 100 may include a load balancer 110, which is coupled to a plurality of nodes 120A-B, each of which includes one or more servers 130A-D. Load balancer 110 is also coupled to clients 160A-C via network 170, and each server 130A-D is also coupled to timer database 150.

Network 170 may be a local area network (LAN), a wide area network (WAN), the Internet, system backplane(s), other type of communication medium, or a combination thereof. Network 170 may be operable to transmit requests for various application services from clients 160A-C to distributed system 100, and to transmit application responses from distributed system 100 to clients 160A-C.

Load balancer 110 is operable to receive requests from clients 160A-C. Load balancer 110 may be operable to forward the requests in a balanced manner to servers 130 A—D, so that each server 130A-D receives approximately the same overall workload and/or number of requests. Load balancer 110 may further be operable to receive responses generated by servers 130A-D, and forward these responses back to the appropriate clients 160A-C.

Each node 120A-B may be a separate hardware system with one or more independent processors, memory, network interfaces and power supplies, as will be described below. Each node 120A-B may be operable to execute one or more software servers 130A-D. In one embodiment, servers 130A-D may be operable to provide an execution environment for various application components, including timer services 142A-D, as will be described further below.

Each server 130A-D may contain a copy of application components 144A-D, and 146A-D. Application components 144A-D and 146A-D may be Java Beans or any other kind of application component. In various embodiments, each application component 144A-D and 146A-D may be operable to provide e-commerce, database access, remote configuration, or any other kind of network or web-based application functionality, as well as provide fail-over protection for other instances of the same application. For example, if server 130A fails, then application component 144A may fail over to another application component, such as 144B on server 130B, which may then handle both its original workload and the workload of 144A, thereby allowing minimal disruption of service.

Each server 130A-D may also contain a failure detection service 140A-D. Each failure detection service 140A-D may be operable to detect the failure of a node 120A-B, server 130A-D, or application 144A-D or 146A-D and notify other components accordingly to begin a fail-over process, as described above. In one embodiment, each failure detection service 140A-D may exchange heartbeat messages with other failure detection services 140A-D to monitor the health of each server. Alternatively, in other embodiments failure detection service 140A-D may instead be implemented as a centralized service operable to detect the failure of various servers in distributed system 100.

Each server 130A-D may further contain a timer service 142A-D. Each timer service 132A-D may be operable to receive a request from application 144A-D or 146A-D for a timer event to be delivered in a specified amount of time. Timer service may then be operable to deliver this event to the requesting application. In various embodiments, timer events may be delivered once, or may be delivered periodically at predetermined intervals. As will be described further below, each timer service 142A-D may also be operable to take over delivery of timer events from another failed timer service 142A-D in conjunction with timer database 150. Each timer service may also be operable to deliver missed timer events. It is noted that in one embodiment each timer service may be able to implement the Enterprise Java Bean Timer Service API.

For example, application component 144A on server 130A may be an active application component that supplies periodic updates to clients 160A-C. These periodic updates are triggered by periodic timer events delivered by timer service 142A. Application components 144B-D on servers 130B-D, respectively, may be operable to continue to provide the functionality of component 144A in response to a server crash or other disruption. Likewise, timer services 142B-D on servers 130B-D, respectively, may be able to provide periodic timer events to application 144A in response to the failure of timer service 142A, as determined by failure detection service 140A-D. Alternatively, timer services 142B-D may be operable to provide periodic timer events to application 144B-D in response to the failure of server 130A or application component 144A.

Timer database 150 may be operable to store one or more timer entries and to retrieve these entries for timer services 142A-D, as will be described in further detail below. In one embodiment, timer database 150 may be located on a separate computer from nodes 120A-B, while in other alternate embodiments, timer database 150 may be located on one or more nodes 120A-B. It is also noted that in various embodiments timer database 150 may be a distributed system with redundant entries to prevent fail-over of a specific component from crippling distributed system 100.

It is noted that many of the details in FIG. 1 are purely illustrative, and that other embodiments are possible. For example, the number of load balancers 110, nodes 120, servers 130, applications 144 and 146 and application components is purely illustrative. Server cluster 100 may have any number of load balancers 110, nodes 120, servers 130, applications or application components. In some embodiments, load balancer 110 may be implemented on one or more of nodes 120 A-B. Furthermore, in some embodiments each server 130A-D may be located on a separate node 120.

Figures 2, 3:
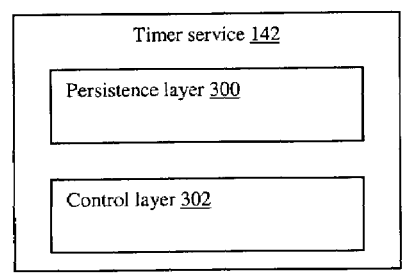
FIG. 2 illustrates timer entries in an exemplary timer database, according to one embodiment.
FIG. 3 is a block diagram of a timer service, according to one embodiment.

FIG. 2 is a diagram illustrating one embodiment of timer database 150. As described above, timer database 150 is operable to store and retrieve one or more timer entries for timer services 142A-D. Each timer entry may comprise multiple distinct fields. Field 200 indicates an identification number associated with each timer entry. Field 202 indicates which server "owns" the timer, and, by extension, which timer service is responsible for servicing and updating that timer, as will be described in further detail below. Field 204 indicates the interval of each timer, which may be, for example, indicated in milliseconds.

Field 206 indicates the expiration time for each timer, i.e., the time at which a timer event should be delivered to the associated application. Field 208 indicates the time at which the entry was last examined by a timer service. As will be described in further detail below, each timer entry may be examined by an associated timer service on a periodic basis. In one embodiment, in response to a failure detection notification from failure detection service 140A-D, another timer service 142A-D may take responsibility for the timer entry, as will be described below. Field 210 indicates if the timer entry is periodic, and will thus be repeatedly delivered to an application on the interval specified by field 204.

It is noted that in various embodiments, timer database may include a lesser or greater number of information fields. For example, in one embodiment timer database 150 may include information indicating to which application timer events associated with a particular timer entry should be delivered. In addition, a timer entry may contain a field which indicates which application component should receive the timer updates in case of fail-over. In various embodiments, timer database 150 may be a data file, data object, or database or any other kind of data storage mechanism.

Turning now to FIG. 3, a block diagram illustrating one embodiment of a timer service 142 is shown. As shown in FIG. 3, timer service 142 may comprise, in one embodiment, a persistence layer 300 and a control layer 302. In one embodiment, persistence layer 300 may be operable to interact with timer database 150. These interactions may include, but not be limited to, creating, deleting, and modifying timer entries. Persistence layer may also be operable to handle fail-over from other timer services, as will be described below in further detail.

It is further noted that in one embodiment, persistence layer 300 may additionally be operable to implement changes to timer database 150 so that any changes may be committed or rolled back in accordance with an associated transaction. For example, if a timer event is cancelled during an attempted transaction, but the transaction is later rolled back, the timer event must be reactivated.

In one embodiment control layer 302 may be operable to interact with and service requests from applications 144A-D and 146A-D. Control layer 302 may thus be able to receive a request for a timer event from an application, internally schedule and track the timer event via an internal timer within control layer 302, then deliver the timer event to the requesting application. Control layer 302 may also be operable to instruct persistence layer 300 to create a new timer entry in timer database 150 in accordance with a received timer request. It is noted that in various embodiments, timer service 142 may be constructed with a greater or lesser number of distinct components.

Figure 4:
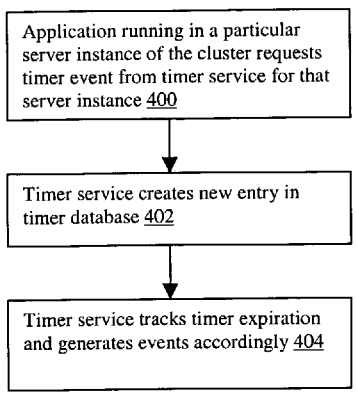
FIG. 4 is a flow diagram illustrating one embodiment of a method for creating a timer.

FIG. 4 is a flow diagram illustrating one embodiment of a method for creating a timer entry. Referring collectively now to FIGS. 1-3, in 400 an application 144A-D or 146A-D executing on a server 130A-D requests a timer event from the timer service 142A-D associated with that server. In 402, the associated timer service 142A-D handle the timer service request internally, as described above in FIG. 3, and creates a new timer entry in timer database 150, as described in FIGS. 2 and 3 above.

In 404, timer service 142A-D begins to track the expiration of the newly created timer and delivers timer events to the requesting application accordingly. It is noted that as timer service 142A-D tracks the internal timer in control layer 302, the timer service may update one or more fields in timer database 150, as will be described below.

Figure 5:
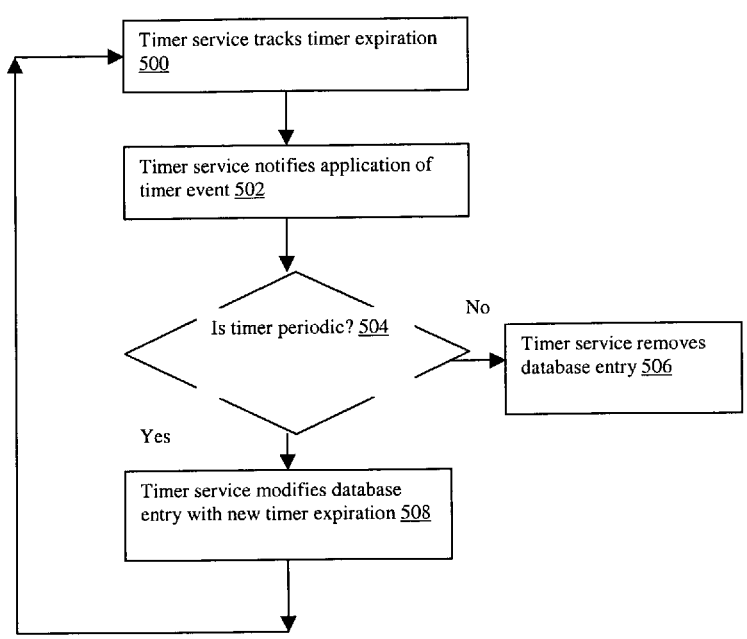
FIG. 5 is a flow diagram illustrating one embodiment of a method for servicing a timer.

FIG. 5 is a flow diagram illustrating one embodiment of a method for handling a timer expiration. Referring collectively now to FIGS. 1-5, in 500 timer service 142A-D tracks the expiration of an internal timer, as described above in FIG. 4. It is noted that during this tracking phase, timer service 142A-D may make multiple periodic checks of the status of the internal timer in control layer 302, and indicate that the timer entry is being actively tracked by updating field 208 in central database 150.

In 502, the timer service detects that the internal timer has expired. Timer service 142A-D may then notify the associated application of the timer event, as described above. In 504 the timer service determines if the timer is periodic, as indicated by field 210. If the timer is not periodic, the timer service removes the associated timer entry from timer database 150 in 506. Alternatively, if the timer is periodic, the timer service resets the internal timer in control layer 302 and updates the timer entry to indicate the new timer expiration date in 508. Specifically, timer service 142A-D may update the timer expiration field 204 to indicate that the timer will now expire at a later time, in accordance with the timer interval field 204. The timer service may then return to 500 to track the timer as described above.

Figure 6:
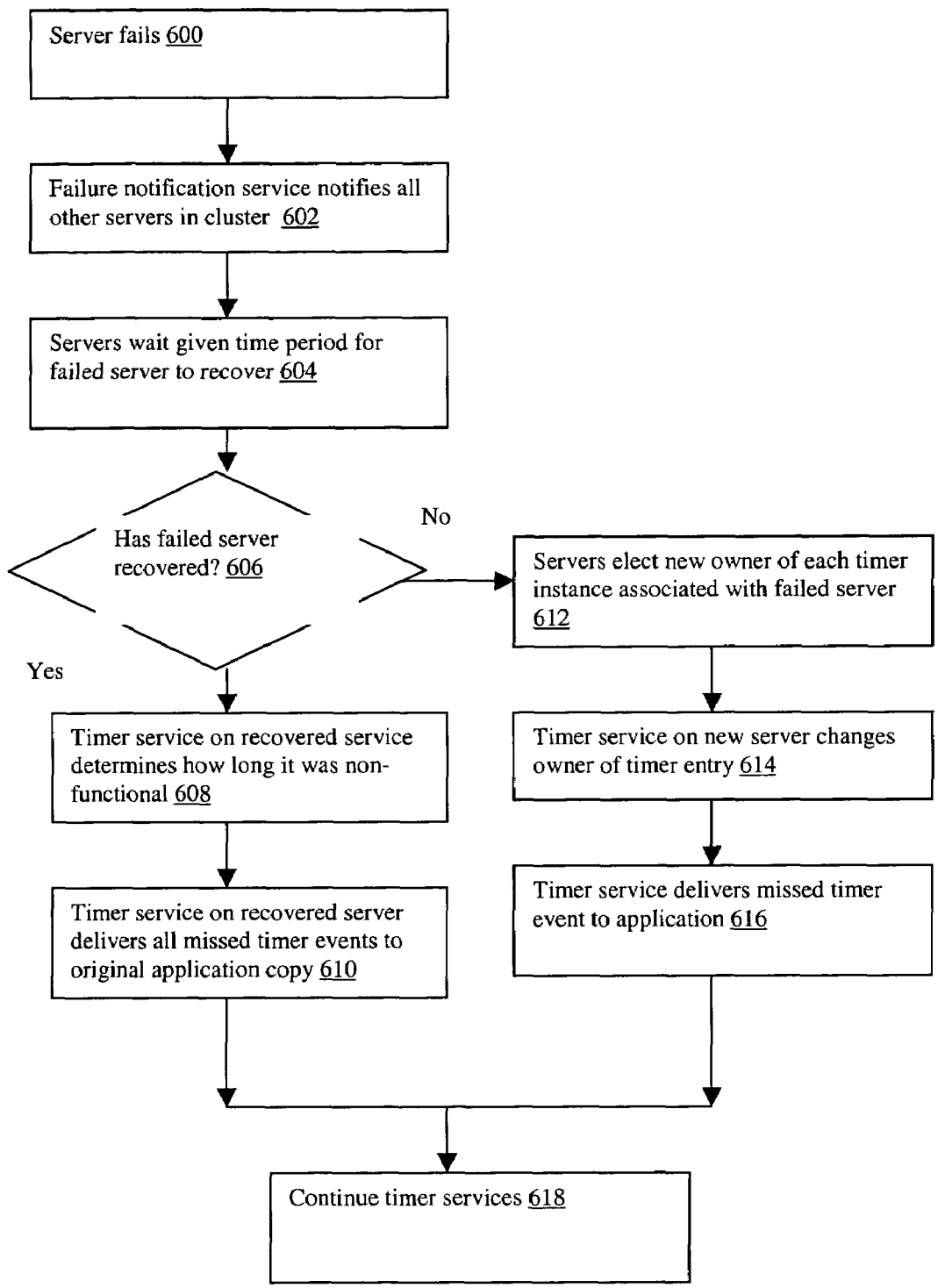
FIG. 6 is a flow diagram illustrating one embodiment of a method for handling a timer failure.

Turning now to FIG. 6, a flow diagram illustrating one embodiment of a method for handling a timer failure is shown. Referring collectively now to FIGS. 1-6, in 600 a server 130A-D fails, triggering the handling method described below. It is noted that in various embodiments, the handling procedure may instead be triggered by the failure of a particular node, timer service, or other component, as described above. In 602 failure notification service 140A-D notifies all remaining servers in distributed system 100 that a server has failed. In 604 all remaining servers 130A-D and their associated timer services 142A-D (specifically, persistence layer 300 of timer services 142A-D) wait a predetermined interval for the failed server to recover. It is noted that by allowing time for a failed server to recover, the method of FIG. 6 may thereby prevent a recovered timer service 142A-D associated with a recovered server 130A-D from interfering with other timer services 142A-D attempting to take over the timers associated with the failed timer service, as will be described below.

In 606 servers 130A-D determine if the failed server has recovered. If so, the recovered timer service 142A-D advances to 608, wherein the recovered timer service determines how long the timer service has been non-functional. In one embodiment, timer service 142A-D may examine the last active field 208 of timer database 150 to determine how much time has elapsed since the timer entries were last updated. The timer service may then deliver timer events for any expired timers to the appropriate applications and set internal timers to monitor all non-expired timer entries. The method then advances to 618, wherein the method continues as described above.

Alternatively if the failed server 130A-D has not recovered by 606, all remaining functional timer services 142A-D advance to 612, wherein each timer entry owned by the failed server is taken over by another timer service, as will be described below in FIG. 7. In 614 persistence layer 300 of the new timer service modifies field 202 of timer database 150. In 616 the new owning timer may then deliver any timer events associated with an expired timer to the appropriate application and track any non-expired timers internally, as described above in 608 and 610. It is noted that in various embodiments, the new owning timer may deliver the appropriate timer events to fail-over instances of the original application, as described above. The remaining functional timer services may then advance to 618, wherein the remaining timers continue to be monitored.

It is noted that, in accordance with the method described in FIG. 6, timer services 142A-D may thus be operable to provide a method for timer service fail-over to a distributed system 100. Timer services 142A-D may be able to take over the timers associated with a failed timer service, while minimizing conflict with a recovered server and recovered timer service, while a central timer database 150 allows all information associated with all timers to be independent of any single failed timer service. It is further noted that the method of FIG. 6 provides for a reliable, once-only delivery system for timer events, since a timer event will always be delivered by the "owning" timer service, but only one timer service is able to own the associated timer entry at any given moment.

Figure 7:
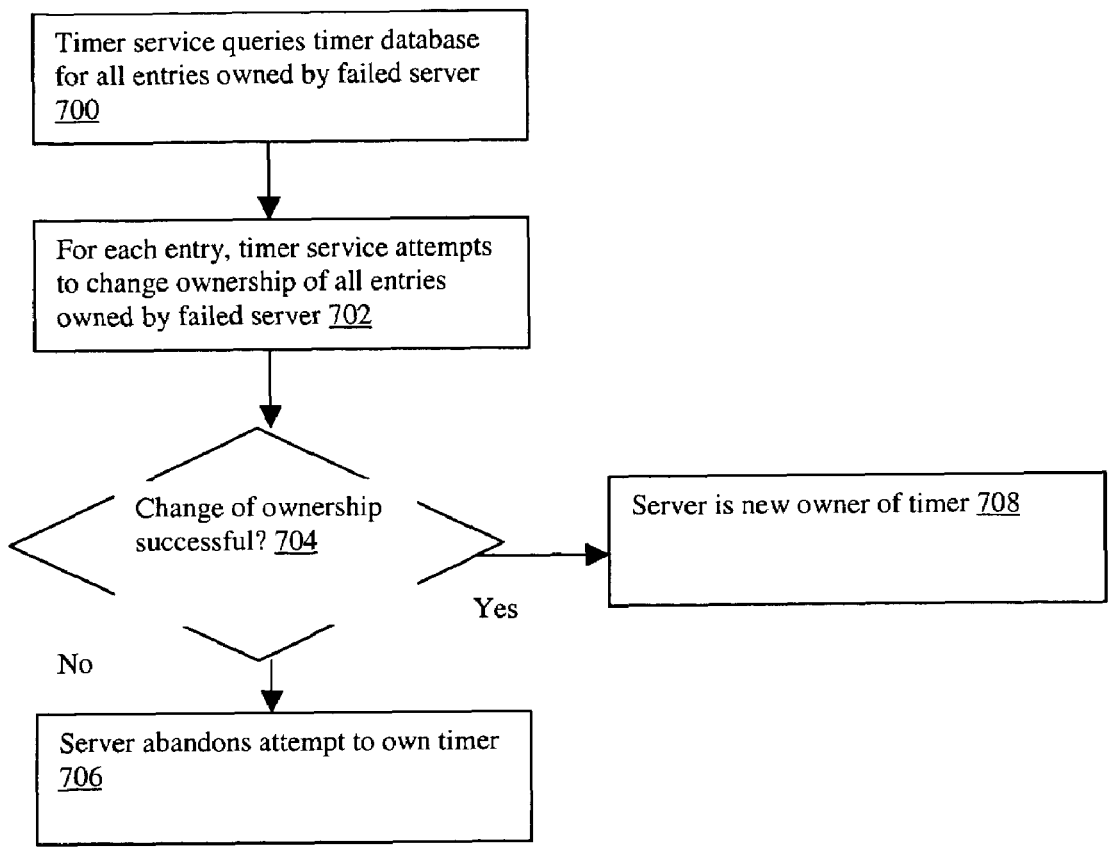
FIG. 7 is a flow diagram illustrating one embodiment of a method for acquiring ownership of a timer.

FIG. 7 is a flow diagram illustrating one embodiment of a method for acquiring ownership of timer entries associated with a failed timer service. Referring collectively now to FIGS. 1-6, in 700 each functional timer service 142A-D queries timer database 150 for all entries owned by the failed server. It is noted that 700 and the associated method may take place as a specific embodiment of steps 612 and 614 of FIG. 6, and may be executed by persistence layer 300 of FIG. 3. However, it is further noted that the method of FIG. 7 may also be executed under other circumstances, such as when a server or an application is manually taken off line by a server administrator, for example.

In 702, persistence layer 300 of each functional timer service 142 A-D attempts to take ownership of each timer entry owned by the failed timer service by attempting to modify field 202 of timer database 150, thereby indicating a new owner of each timer. In one embodiment, the ability of each timer entry to modify field 202 and thus acquire ownership of each timer entry may be determined by which timer service first acquires a lock associated with the entry. It is accordingly noted that in one embodiment, various timer services may take ownership of various respective timer entries, whereas in another embodiment, a single timer service may take ownership of all timer entries associated with the failed timer service.

In 704 each timer service 142A-D determines if it has been successful in acquiring ownership of each timer entry by determining if field 202 indicates that it is the new timer owner. If the timer service was successful, the timer service will be the owner of the timer entry in 708, otherwise the timer service abandons the attempt to own the timers in 706. It is noted that in various embodiments other mechanisms may be used to change the ownership of timer entries associated with a failed timer service, such as a round-robin or highest-random-number selection routine.

It is further noted that in various embodiments, timer requests may be stopped or migrated by a server administrator, or cancelled by an application. In one embodiment, when a timer is cancelled by an application, the timer service which owns the timer entry may receive a notification to stop the timer and remove the appropriate entry from timer database 150. Alternatively, in another implementation each timer entry in timer database 150 may have an additional field which indicates if the timer is still active. This field may be modified by an application that wishes to cancel a timer, and checked by the timer service which owns the timer entry prior to the delivery of each timer event. If the field indicates that the timer is no longer active, the timer event will not be delivered.

In one embodiment, an application component running on a particular server of a cluster may cancel any or all timers within the cluster. For example, an application component (e.g. EJB) running on a particular server can locate timers associated with other servers in the cluster. An application component may discover all timers in the cluster and cancel all timers in the cluster. The failure detection and notification mechanisms on each server may be used to coordinate timer cancellations. In some embodiment, an application component may acquire one or more timers in the cluster and change ownership of the one or more timers to another server of the cluster. In one embodiment, an application component API (e.g. an EJB API) may include interfaces for timer cancellation, as well as other timer operations, such as for accessing the timer service and receiving timer notifications.

Figure 8:
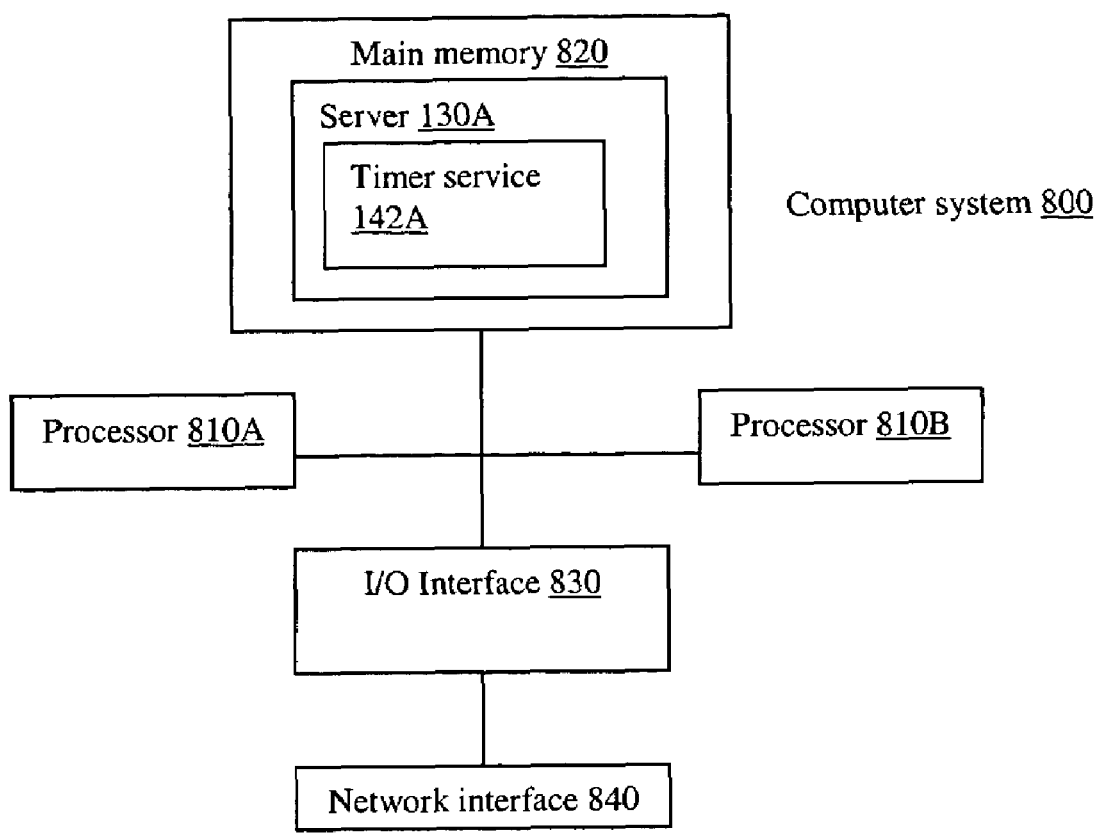
FIG. 8 illustrates an exemplary computer subsystem for implementing a highly available timer service, according to one embodiment.

Turning now to FIG. 8, an exemplary computer subsystem 800 is shown. Computer subsystem 800 includes main memory 820, which is coupled to multiple processors 810A-B, and I/O interface 830. It is noted that the number of processors is purely illustrative, and that one or more processors may be resident on the node. I/Q interface 830 further connects to network interface 840. Such a system is exemplary of a load balancer, a server in a cluster or any other kind of computing node in a distributed system. Such a system may also be exemplary of nodes 120A-B, as described in FIG. 1. Processors 810A-B may be representative of any of various types of processors such as an x86 processor, a PowerPC processor or a CPU from the SPARC family of RISC processors. Likewise, main memory 820 may be representative of any of various types of memory, including DRAM, SRAM, EDO RAM, DDR SDRAM, Rambus RAM, etc., or a nonvolatile memory such as a magnetic media, e.g., a hard drive, or optical storage. It is noted that in other embodiments, main memory 800 may include other types of suitable memory as well, or combinations of the memories mentioned above.

As described in detail above in conjunction with FIGS. 1-7, processors 810A-B of computer subsystem 800 may execute software configured to execute a method for timer service fail-over on a distributed system. The software may be stored in memory 820 of computer subsystem 800 in the form of instructions and/or data that implement the operations described above.

For example, FIG. 8 illustrates server 130A and a timer service stored in main memory 820. The instructions and/or data that comprise server 130A and timer service 142A may be executed on one or more of processors 810A-B, thereby implementing the various functionalities of server 130A and timer service 142A as described above. In addition, other components not pictured such as a display, keyboard, mouse, or trackball, for example may be added to computer subsystem 800. These additions would make computer subsystem 800 exemplary of a wide variety of computer systems, such as a laptop, desktop, or workstation, any of which could be used in place of computer subsystem 800.

Various embodiments may further include receiving, sending or storing instructions and/or data that implement the operations described above in conjunction with FIGS. 1-7 upon a computer readable medium. Generally speaking, a computer readable medium may include storage media or memory media such as magnetic or optical media, e.g. disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
    a plurality of servers in a cluster, wherein each server comprises a respective timer service of a plurality of timer services and is configured to execute one or more application instances; and
    a failure detection service operable to detect a failure in the plurality of servers in the cluster;
    wherein each given timer service of said plurality of timer services is operable to:
        service timer requests from the one or more application instances on the respective server that comprises said given timer service;
        in response to the failure detection service detecting a failure of an other timer service of said plurality of timer services on an other server of said plurality of servers, take over one or more pending timer requests of the other timer service, wherein, prior to the failure detection service detecting said failure, said one or more pending timer requests are designated to be serviced by said other timer service in the cluster;
        wherein upon taking over the one or more pending timer requests from said other timer service, the given timer service is operable to service said one or more pending timer requests by providing one or more missed timer notifications to one or more of the application instances, wherein each given timer service configured to take over the one or more pending timer requests from said other timer service is operable to service said one or more pending timer requests by delivering one or more missed timer notifications to a fail-over application instance; and
        service the one or more pending timer requests taken over by the given timer service.

2. The system of claim 1, wherein each given timer service of said plurality of timer services is further operable to:
    wait for a specified time period prior to assuming taking over the one or more pending timer requests of the other timer service in the cluster after the failure detection service detects the failure of said other timer service; and
    take over the one or more pending timer requests in response to determining that said other timer service has not recovered from the failure within the specified time period.

3. The system of claim 1, further comprising a timer database storing information indicating one or more pending timer requests as designated to be serviced by respective ones of said plurality of timer services.

4. The system of claim 3, wherein each timer service of said plurality of timer services is operable to acquire information indicating the one or more pending timer requests designated to be serviced by said other timer service from the timer database upon taking over the one or more pending timer requests from the other timer service.

5. The system of claim 1, wherein each server is configured to execute a respective instance of the failure detection service.

6. The system of claim 1, wherein each of said one or more pending timer requests of said other timer service is taken over by only one respective timer service in the cluster.

7. A method, comprising:
    executing each of a plurality of application instances on a respective server of a plurality of servers in a cluster;

for each of one or more timer requests from one or more of the plurality of application instances executing on a particular server of said plurality of servers, servicing the timer request via a given timer service located on the particular server;

detecting a failure of the given timer service, wherein, prior to the detection of said failure, one or more pending timer requests are designated to be serviced by said given timer service;

in response to detecting said failure, each of one or more other timer services executing on one or more of the plurality of servers taking over at least one of said one or more pending timer requests from said given timer service in the cluster;

subsequent to taking over the one or more pending timer requests from the failed timer service, providing via said one or more other timer services one or more missed timer notifications to the one or more application instances, wherein said providing one or more missed timer notifications to the one or more application instances comprises delivering said one or more missed notifications to a fail-over application instance; and for a each given pending timer request taken over by a respective timer service of said one or more other timer services, servicing the given pending timer request via the respective timer service that took over said given pending timer request.

8. The method of claim 7, further comprising:

at least one of said one or more other timers services waiting for a specified time period prior to said taking over the one or more pending timer requests from the given timer service in the cluster after detecting said failure of the given timer service; and said at least one of said one or more other timer services taking over the one or more pending timer requests in response to determining that said given timer service has not recovered from the failure within the specified time period.

9. The method of claim 7, further comprising storing information indicating the one or more pending timer requests in a timer database accessible to said one or more other timer services.

10. The method of claim 9, further comprising acquiring, via the one or more other timer services, the information indicating the one or more pending timer requests from the timer database subsequent to taking over the one or more timer operations from the given timer service that has failed.

11. The method of claim 7, wherein each server of the plurality of servers in the cluster comprises an instance of a timer service and an instance of a failure detection service to detect failures of timer services on other servers of the plurality of servers in the cluster.

12. The method of claim 7, wherein each pending timer request of said given timer service is taken over by a different timer service in the cluster.

13. A computer accessible medium storing computer-executable program instructions configured to implement a plurality of instances of a distributed timer service, wherein each instance of the distributed timer service is configured to:

service one or more timer requests from one or more application instances executing on a server on which the instance of the distributed timer service is executing, wherein said server is one of a plurality of servers in a cluster;

receive notification of a failure of an other instance of the distributed timer service executing on another server of said plurality of servers in the cluster, wherein, prior to said failure of said other instance of the distributed timer service, one or more pending timer requests are designated to be serviced by said other instance of the distributed timer service;

in response to said notification, take over one or more pending timer requests from the other instance of the distributed timer service in the cluster;

providing one or more missed timer notifications to the one or more application instances subsequent to taking over the one or more pending timer requests from the other instance of said distributed timer service, wherein said providing one or more missed timer notifications to the one or more application instances comprises delivering one or more missed notifications to a fail-over instance of an application that originally requested the timer operation from the other instance of the distributed timer service; and for each pending timer request that is taken over, servicing the pending timer request.

14. The computer accessible medium of claim 13, wherein each instance of the distributed timer service is further configured to:

after receiving said notification, wait for a specified time period prior to taking over the one or more pending timer requests from the other instance of the distributed timer service in the cluster; and taking over the one or more pending timer requests in response to determining that the other instance of the distributed timer service has not recovered from the failure within the specified time period.

15. The computer accessible medium of claim 13, wherein each instance of the distributed timer service is configured to store information in a timer database, said information indicating one or more timer requests.

16. The computer accessible medium of claim 15, wherein each instance of the distributed timer service is configured to acquire information indicating the one or more pending timer requests of the other instance of the distributed timer service from the timer database subsequent to taking over the one or more pending timer requests from the other instance of the distributed timer service.

17. The computer accessible medium of claim 13, wherein an instance of said distributed timer service is configured to run on each server of the plurality of servers in the cluster.

18. The computer accessible medium of claim 13, wherein each instance of the distributed timer service is configured to not take over a particular timer operation of the failed timer service instance in response to a determination that another instance of the distributed timer service in the cluster has already assumed taken over the particular timer operation.

* * * * *

UNITED STATES PATENT AND TRADEMARK OFFICE
CERTIFICATE OF CORRECTION

| | | |
|---|---|---|
| PATENT NO. | : 7,526,551 B1 | Page 1 of 1 |
| APPLICATION NO. | : 10/676635 | |
| DATED | : April 28, 2009 | |
| INVENTOR(S) | : Akm N. Islam et al. | |

It is certified that error appears in the above-identified patent and that said Letters Patent is hereby corrected as shown below:

Claim 2 col. 8, line 41, please delete "assuming".

Signed and Sealed this

Ninth Day of June, 2009

JOHN DOLL
*Acting Director of the United States Patent and Trademark Office*